United States Patent
Ahrens et al.

(10) Patent No.: US 8,130,768 B1
(45) Date of Patent: Mar. 6, 2012

(54) ENHANCED GATEWAY FOR ROUTING BETWEEN NETWORKS

(75) Inventors: David C. Ahrens, San Jose, CA (US);
Russell C. Jones, San Jose, CA (US);
Rohit Mehta, Davis, CA (US)

(73) Assignee: Avaya Inc., Basking Ridge, NJ (US)

( * ) Notice: Subject to any disclaimer, the term of this patent is extended or adjusted under 35 U.S.C. 154(b) by 790 days.

(21) Appl. No.: 11/183,107

(22) Filed: Jul. 14, 2005

(51) Int. Cl.
*H04L 12/28* (2006.01)

(52) U.S. Cl. ........ 370/401; 370/352; 370/389; 370/392; 709/226

(58) Field of Classification Search .................. 370/352, 370/353, 389, 392, 401, 226, 338; 707/10
See application file for complete search history.

(56) References Cited

U.S. PATENT DOCUMENTS

| | | | | |
|---|---|---|---|---|
| 6,449,647 | B1 * | 9/2002 | Colby et al. ................. | 709/226 |
| 7,200,144 | B2 * | 4/2007 | Terrell et al. ................. | 370/389 |
| 7,274,684 | B2 * | 9/2007 | Young et al. ................. | 370/352 |
| 2001/0005369 | A1 * | 6/2001 | Kloth ........................... | 370/392 |
| 2003/0016679 | A1 * | 1/2003 | Adams et al. ................. | 370/401 |
| 2003/0128696 | A1 * | 7/2003 | Wengrovitz et al. .......... | 370/352 |
| 2003/0133443 | A1 * | 7/2003 | Klinker et al. ................. | 370/353 |
| 2003/0210694 | A1 * | 11/2003 | Jayaraman et al. ........... | 370/392 |
| 2003/0223419 | A1 * | 12/2003 | Yasaki et al. .................. | 370/389 |
| 2004/0090971 | A1 * | 5/2004 | Anderson, IV ............... | 370/401 |
| 2005/0022007 | A1 * | 1/2005 | Phillips et al. ................. | 713/201 |
| 2006/0173859 | A1 * | 8/2006 | Kim et al. ...................... | 707/10 |

* cited by examiner

*Primary Examiner* — Dang Ton
*Assistant Examiner* — Mohamed Kamara
(74) *Attorney, Agent, or Firm* — Sheridan Ross P.C.

(57) ABSTRACT

A network gateway is disclosed, wherein for a received communication, the gateway determines a network component to which information for the communication is routed based upon one or more of: (a) a characterization of the source of the communication, (b) a characterization of non-address data in the communication, and (c) services applied to the communication by the gateway. The characterization of the communication source can be related to a perceived risk that the communication may be illicitly compromised or may cause a malfunction in a network component. The characterization of non-address data identifies a use of the communication, or service to be applied to the communication prior to reaching its destination, or a security feature (or lack thereof) of the communication. The services applied by the gateway are generally generic services for facilitating appropriate non-malicious communications, e.g., such services can be for a firewall, secure communications (virtual private network), FTP communications, voice over IP, email, and general Internet communications.

24 Claims, 5 Drawing Sheets

ROUTING TABLE/RULE BASE 78

| SOURCE ZONE | DATA PACKET CHARACTERISTIC(S) | Services Set | TARGET IP ADDRS |
|---|---|---|---|
| SECURE ZONE | ANY DATA PACKET TYPE | (PERFORM NO SERVICES) | 172.16.1.1 |
| ANY ZONE BUT SECURE ZONE | IP NON-VOICE, NON-FTP PACKETS | FW | 86.33.7.2 |
| ANY ZONE BUT SECURE ZONE | IP NON-VOICE VPN PACKETS | VPN →NAT | 192.168.1.32 |
| ANY ZONE BUT SECURE ZONE | IP VOICE PACKETS | VoIP | 194.172.1.14 |
| ANY ZONE BUT SECURE ZONE | IP NON-VOICE, FTP PACKETS | FW + FTP | 192.0.2.32 |
| ANY ZONE BUT SECURE ZONE | STREAMING MULTIMEDIA VPN PACKETS | FW + NAT | 86.33.7.2 |
| FROM ANY ZONE EXCEPT INSECURE ZONE | ANY PACKET NOT IDENTIFIED ABOVE | FW | 86.33.7.2 |
| INSECURE ZONE | ANY PACKET NOT IDENTIFIED FROM ROUTER 24 ABOVE | FW | 194.172.1.14 |

Fig. 3

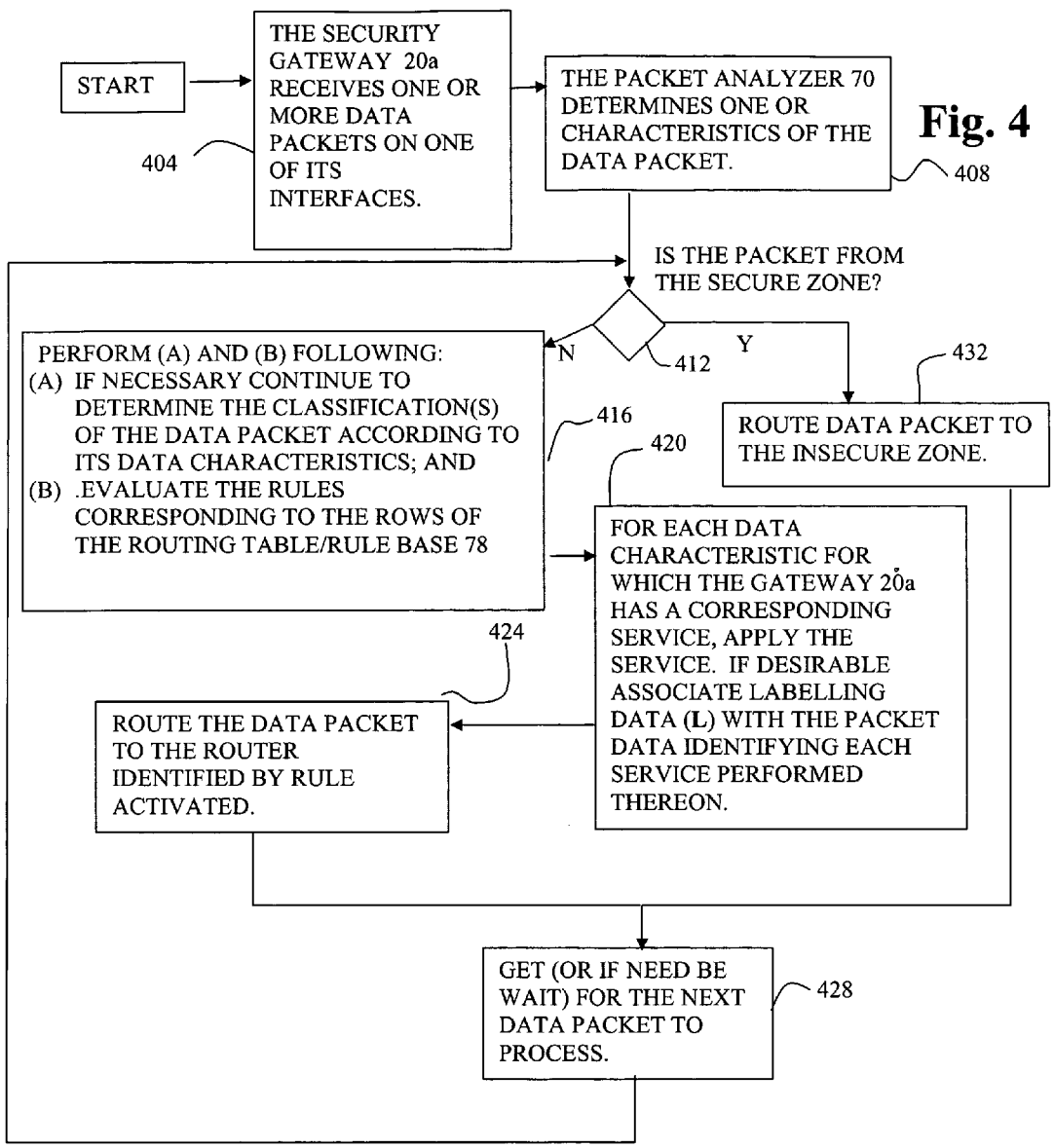

ROUTING TABLE/RULE BASE 78

| SOURCE ZONE | DATA PACKET CHARACTERISTIC(S) | Services Set | TARGET IP ADDRS |
|---|---|---|---|
| SECURE ZONE | ANY DATA PACKET TYPE | (PERFROM NO SERVICES) | 172.16.1.1 |
| INSECURE ZONE | IP NON-VOICE VPN PACKETS | VPN → NAT | 192.168.1.32 |
| DMZ ZONE | IP NON-VOICE, NON-FTP PACKETS | FW | 86.33.7.0 |
| SEMI-SECURE ZONE | IP NON-VOICE VPN PACKETS | VPN →NAT | 192.168.1.32 |
| INSECURE ZONE | IP VOICE PACKETS | VoIP | 194.172.1.14 |
| INSECURE ZONE | IP NON-VOICE, NON-FTP PACKETS | FW | 86.33.7.0 |
| INSECURE ZONE | IP NON-VOICE, FTP PACKETS | FW + FTP | 192.0.2.32 |
| INSECURE ZONE | STREAMING MULTIMEDIA VPN PACKETS | FW + NAT | 86.33.7.0 |
| FROM ANY ZONE EXCEPT INSECURE ZONE | ANY PACKET NOT IDENTIFIED ABOVE | (PERFORM NO SERVICES) | 172.16.1.1 |
|  |  | FW | 86.33.7.0 |
| INSECURE ZONE | ANY PACKET NOT IDENTIFIED FROM ROUTER 24 ABOVE | FW | 194.172.1.14 |

Fig. 5

ENHANCED GATEWAY FOR ROUTING BETWEEN NETWORKS

RELATED FIELD OF INVENTION

The present invention is generally directed to network gateways, and in particular, to a gateway that routes network communications, received at the gateway, based on the utilities or transformations applied to the communications by the gateway.

BACKGROUND

Numerous network services are now available for communications on and between networks such as the Internet, wide area corporate networks as well as networks at a single site. Such services (also denoted "network services" herein) include firewall protection, network address translation (NAT), encryption/decryption, secure communication tunnels such as is provided in virtual private networks (VPN), file transfer protocol (FTP) services, voice over Internet protocol (VoIP), etc. For inter-network communication, these services are preferably performed at a small number of designated nodes on a network so that the services can be more easily maintained and supervised by network system administrators. In particular, for inter-network communication, these services may be concentrated at substantially only nodes of a network, wherein such nodes directly interface with other networks. One particular type of such network interface nodes at which such services are concentrated is known as a "gateway", wherein each such gateway node performs one or more of the above-identified services as well as routes communications between the networks to which the gateway node is connected (e.g., has a corresponding network address thereon). Thus, such gateway nodes may be considered as value added intermediaries that provide enhanced communications (e.g., more secure, and/or more reliable communications) between two parties on different networks that communicate via the gateway.

Referring to FIG. 1, heretofore such a gateway (e.g., gateway node 20) may provide network services such as those described above for data transmissions between the networks 14, 16, and 18 connected to the gateway. In particular, such services are generally applied for the benefit of users in certain predetermined networks (denoted "internal" networks herein"), e.g., networks 14 and 16 in FIG. 1. Thus, for IP transmissions from the "external" network 18 that are bound for an IP address in one of the networks 14 and 16 (via the gateway 20), such network services can be applied by the gateway. However, the application of such network services has been limited and inflexible.

Prior to providing further description of such prior gateway limitations and inflexibility, the notation of FIG. 1 is briefly described. Representative IP addresses in FIG. 1 are shown as call-outs for many of the interfaces between network components. As one skilled in the art will understand, there is a unique IP address for each end of each communication path between any two network components. Thus, referring to the communications link between router 32 and router 48 of the network 14, the router 48 knows the router 32 by the IP address 12.1.2.2, and the router 32 knows the router 48 by the IP address 12.1.2.1. Additionally, the routers 24, 32, and 36 that are directly connected to the gateway node 20 have respective IP addresses 172.16.1.1, 194.176.1.14, and 192.168.1.32.

The gateway node 20 of FIG. 1 may be substantially isolated from changes to IP addresses external to networks 14 and 16 by the router 24. For example, the routing table 28 at the gateway node 20 has explicit routing information only for destination IP addresses: (a) in the IP address range 11.1.2.0/24 (i.e., the 254 IP addresses: 11.1.2.1 through 11.1.2.254, as one skilled in the art will understand) for routing via router 32 (having IP address 194.172.1.14), and (b) in the IP address range 10.1.1.0/24 (i.e., the 254 IP addresses: 10.1.1.1 through 10.1.1.254) for routing via the router 36 (having IP address 192.168.1.32). Thus, for any IP transmission encountered having a destination IP address not in the above ranges (a) and (b), the gateway node 20 assumes the IP transmission is for a destination external to the networks 14 and 16. Accordingly, the gateway node 20 routes such an IP transmission to a default route which in the present case routes the transmission to the router 24 (i.e., IP address 172.16.1.1). Note that the router 24 is typically a network device on the Internet side of the gateway node 20. Thus, if an IP transmission that has endpoint 40 of network 18 as a destination, the gateway node 20 does not have an IP address range for the endpoint 40, but the gateway is able to route the transmission to the router 24.

Heretofore, however, such gateway node 20 has not been isolated from network changes within the corresponding network(s) (e.g., 14 and 16 in FIG. 1) for which it provides network services. For example, for an IP transmission from endpoint 40 to, e.g., user station 44 having IP address 11.1.2.2, if the router 48 network connection is modified so that this router connects directly to the gateway node 20 and no longer connects to router 32, then the routing table 28 at the gateway must be changed, replacing the entry:

<11.1.2.0/24 194.172.1.14> with the entry

<11.1.2.0/24 12.1.2.1>.

Otherwise, the IP transmission will not reach user station 44. Unfortunately, requiring the gateway node 20 to perform such detailed routing implies that for at least large networks, frequent routing table 28 changes can be required.

Additionally, heretofore there has been no effective way to configure a gateway node 20 so that the routing decision for an IP transmission is determined based upon what gateway supplied network services (e.g., firewall protection, NAT, encryption/decryption, VPN, file FTP, VoIP, etc.) are applied to the IP transmission. At most, such a prior art gateway node 20 may have specified gateway services performed depending on the source (e.g., originating IP address) of an IP transmission, or on an IP destination address determined by the gateway 20. For example, such a gateway node 20 may have been configured so that a particular set of network services are applied to IP transmissions whose source is external to the networks 14 and 16. Additionally, such a gateway node 20 may have been configured so that a second set of network services could be applied to intra-network IP transmissions (e.g., between user station 44 and user station 52). However, since there has been no effective way to configure a gateway node 20 to make its routing decision for an IP transmission based upon what gateway supplied network services are performed, routing configuration changes are always required when new networks are added that need these networks services.

Accordingly, it is desirable to provide enhancements to gateway nodes 20 wherein such enhancements both isolate such gateways from substantially all network addressing changes (i.e., both internal and external network addressing changes), and also provide enhancements so that such gateways can selectively route inter-network communications according to the services applied to such communications.

Terms and Descriptions

Data Packet: A single network frame transmission from one network endpoint to another. The term "data packet" is typically contrasted to a "Voice Packet" by the presumption that the delivery of data packets is less time-sensitive than the delivery of voice packets to achieve a productive level of communication.

Denial of Service Analysis: An analysis of network communications for detecting an illicit application that is transmitting certain types of requests to a user station (e.g., an IP telephone) so that the telephone becomes effectively non-responsive to one or more legitimate network requests. For example, the illicit application might send a high volume of requests or requests that are known to reset the user station.

DiffServ bits: The six most-significant bits (MSB) of the ToS field of IPv4, as one skilled in the art will understand.

DMZ zone: For a given organization or company, a DMZ zone (demilitarized zone) is a collection of one or more networks, wherein each network (N) of the networks allows users of the network N to access a public network (e.g., the Internet), and/or the network N provides a service that is publicly available to at least one party outside the organization or company. For example, the network 14 (FIGS. 1 and 2) may provide access to a particular Internet page(s), or provide network access to customer support personnel. Additionally, users of the network 14 may need to access a public network for email, file transfer protocol (FTP) data transfers, Internet web servers, etc.

GRE: Generic Routing Encapsulation: Tunneling protocol developed by Cisco Systems Inc. that encapsulates a wide variety of protocol packet types inside an IP packet.

H 323: An ITU standard suite of IP-based protocols used for VoIP call signaling (e.g., for call setup, negotiation and call teardown, as one skilled in the art will understand).

H.323 Gatekeeper: A network entity that controls H.323 endpoints (e.g., IP Phones). The primary functions of the H.323 Gatekeeper are to control H.323 endpoints that are admitted to the network (by authenticating those endpoints), and translating the logical addresses (e.g., a phone extension: 123) to the corresponding IP addresses supporting that extension (e.g., to an IP address: 10.0.0.1).

H.323 Proxy: A network entity that establishes H.323 Call Signaling connections (i.e., TCP connections) on behalf of an H.323 endpoint (e.g., IP Phone).

H.323 Session: An ongoing VoIP call signaling connection (i.e., TCP connection) between an H.323 endpoint (e.g., an IP Phone), and an H.323 Gatekeeper.

ITU: Abbreviation for International Telecommunications Union, which is a standards body established by the United Nations to set international telecommunications standards.

Insecure zone: For a given organization or company, an insecure zone is a collection of one or more networks, wherein communications with each of the networks can not be assumed to be secure. For example, there may no guarantee (without taking explicit actions to provide such a guarantee) that communications with a source from an insecure zone: is not being intercepted or spoofed, is free of viruses, worms, malware, and/or spyware. There may be additionally no assurance that such communications are even from an intended source. Typically, the insecure zone will include the Internet and/or any other publicly accessible network whose access can not be controlled by the organization or company.

RTP: Abbreviation for Real Time Protocol, which is A UDP-based protocol for carrying media streams (e.g., voice, video, multi-media) as one skilled in the art will understand.

RSVP: Abbreviation for Resource Reservation Protocol, which a protocol used to provide quality of service (QoS) services. RSVP is an "end-to-end" protocol where each device in the network path between (and including) the endpoints participates in the RSVP negotiation to reserve the resources necessary (e.g., bandwidth, and DSPs) to deliver the agreed-upon level of service.

Secure zone: For a given organization or company, a secure zone is a collection of one or more networks, wherein each network is only accessible from known and authorized users (e.g., company employees). Typically, unauthorized access will be denied, and firewalls will be in place to prevent certain types of communications from entering the network (e.g., communications with executable downloads, scripts, viruses and/or advertising). Moreover, communication external to the secure zone may be via a virtual private network (VPN) as one skilled in the art will understand.

Semi-Secure zone: For a given organization or company, a semi-secure zone is a collection of one or more networks, wherein communications on each network is desired to be as secure as networks identified as being included in a secure zone. However, networks of a semi-secure zone use a transmission medium that may be more vulnerable to attack than another medium due to, e.g., the ease of interception of the network communications. For example, a network in a semi-secure zone may be partially or wholly wireless such as a wireless LAN. Accordingly, communications on such a network are likely to be encrypted or encrypted with a stronger encryption than communications with a network of another zone.

Stateful Inspection The ability of a network device, typically a firewall, to retain "state" information about ongoing network sessions. When a packet is allowed to traverse a stateful firewall according to the firewall's rules, the firewall will only permit traffic that would normally be returned in response to the original packet from the original packet's destination ToS field: The second byte of the IP header in IPv4.

Zone: A collection of one or more communication networks that communicate with a network gateway via a single router, wherein each of the networks have a common security classification related to the security of communications from nodes of the networks to the gateway.

SUMMARY

The present invention is directed to a network gateway for routing communications between a plurality networks (or between collections of networks), wherein embodiments of the invention are such that substantially all network addressing changes in each (or at least some) of these networks are transparent to the gateway. Additionally, embodiments of the present invention may be directed to a network gateway wherein the gateway identifies and applies network services to communications received at the gateway according to the structure and/or contents of the data transmitted in the communications. Moreover, embodiments of the present invention may be directed to determining output destinations for gateway received communications, wherein for such a communication, the corresponding output destination is identified according to one or more of: (a) an identification of a source of a communication, (b) the structure of the data in a communication, (c) the contents of the data in the communication, (d) the services identified for application to the data of the communication, and/or (e) the services applied to the data of the communication.

It is an aspect of at least one embodiment of the invention that communications received at the gateway are analyzed for determining which (if any) gateway services are to be applied to such communications. In particular, such an analysis may classify the communications (or portions thereof, e.g., data packets of packetized communications) according to (a) through (e) immediately above. Moreover, it is yet another aspect of a gateway of the invention that the routing of communications out of the gateway is substantially dependent on such analysis. For example, such a classification of a gateway communication may be all that is needed to identify an output destination of the communication. Alternatively, such a classification in combination with the gateway services applied to such a communication may be sufficient for determining an output destination for the communication. Accordingly, in either case, gateway routing is substantially independent of network addressing changes.

In one embodiment of the gateway, it may provide one or more services for enhancing communications and/or providing additional security to at least one network communicating with the gateway. The following are representative examples of various services that an embodiment of a gateway according to the present invention may provide:

(1.1) Ensure or increase the security of at least one network that communicates with another network (e.g., the Internet) via the gateway. For example, such gateway services may be firewall services (also denoted "FW" herein) such as: virus scans, removal of spam email, prohibit certain types of executable communications from being transferred, prohibit web sites with certain administrator-defined content from being visited, blocking all IP communication considered improper (e.g., blocking all communication into the network that is sourced from a network providing such improper communications), all the while allowing legitimate IP communication to flow.

(1.2) Provide appropriate network address translation (also denoted "NAT" herein) to connect a private IP network to a public network (e.g., the Internet) so that internal IP addresses can be hidden and publicly-assigned, routable IP addresses can be conserved.

(1.3) Provide services for secure communications (also denoted "VPN" herein) such as encryption, and decryption, as well as, secure tunnels such as virtual private networks.

(1.4) Monitor communications for illicit or improper communications to a user station such as: (i) denial of service attacks, wherein an illicit application floods a user station (e.g., an IP telephone) with a sufficiently high volume of requests so that the telephone is effectively non-responsive to one or more legitimate network requests, and/or (ii) "Man-in-the-middle" attacks, wherein an illicit application monitors communications at a user station, and intercepts a registration request by a legitimate application for spoofing a reply to the user station or to the legitimate application. In particular, the illicit application may provide the legitimate application with a false IP address for sending login information so that the illicit application can then login to the legitimate application.

(1.5) Monitor application access so that such access conforms to the conditions of a license.

(1.6) Provide "proxy" services which establish network communication connections to and/or through a public network (e.g., the Internet) on behalf of requesting user stations. This also allows the originators of such connections to be hidden from a public network and also provides the administrator with a central point of administration.

In at least one embodiment of the invention, at least some of the networks communicating with the gateway according to the present invention are classified by the characteristics of the networks. In particular, such a network may be classified according to how secure (or insecure) communications with the network are perceived to be. Such security classifications are referred to herein as "zones" (see the Terms and Description section hereinabove for further description of a zone, and representative examples such as a "secure zone", and a "semi-secure zone"). Moreover, an embodiment of the gateway of the invention may use such zone classifications of networks to also assist in determining the destination of communications from these networks when routing such communications out of the gateway. However, it is within the scope of the invention that a gateway according to the present invention may utilize other classifications for networks communicating with the gateway than the zones described hereinabove. For example, networks (or collections of networks) may be classified according to the types of user stations supported. Thus, a network wherein each of the user stations is an IP enabled telephone may be classified differently from a network of personal computers with Internet access.

Further description of advantages, benefits and patentable aspects of the present invention will become evident from the accompanying drawings and description hereinbelow. All novel aspects of the invention, whether mentioned explicitly in this Summary section or not, are considered subject matter for patent protection either singly or in combination with other aspects of the invention. Accordingly, such novel aspects of the present invention disclosed hereinbelow and/or in the drawings that may be omitted from, or less than fully described in, this Summary section are fully incorporated herein by reference into this Summary. In particular, all claims of the Claims section hereinbelow are fully incorporated herein by reference into this Summary section.

BRIEF DESCRIPTION OF THE DRAWINGS

FIG. 3 is an example of the structured data retained (or accessed) by the routing table/rule base 78 shown in FIG. 2, wherein such structured data corresponds to rules for both processing data packets received at the gateway 20a, and determining how to route such data packets out of the gateway.

FIG. 4 shows a high level flowchart of the steps performed by the gateway 20a according to the present invention.

FIG. 5 shows another embodiment of the structured data retained (or accessed) by the routing table/rule base 78 shown in FIG. 2.

DETAILED DESCRIPTION

Figure 1:
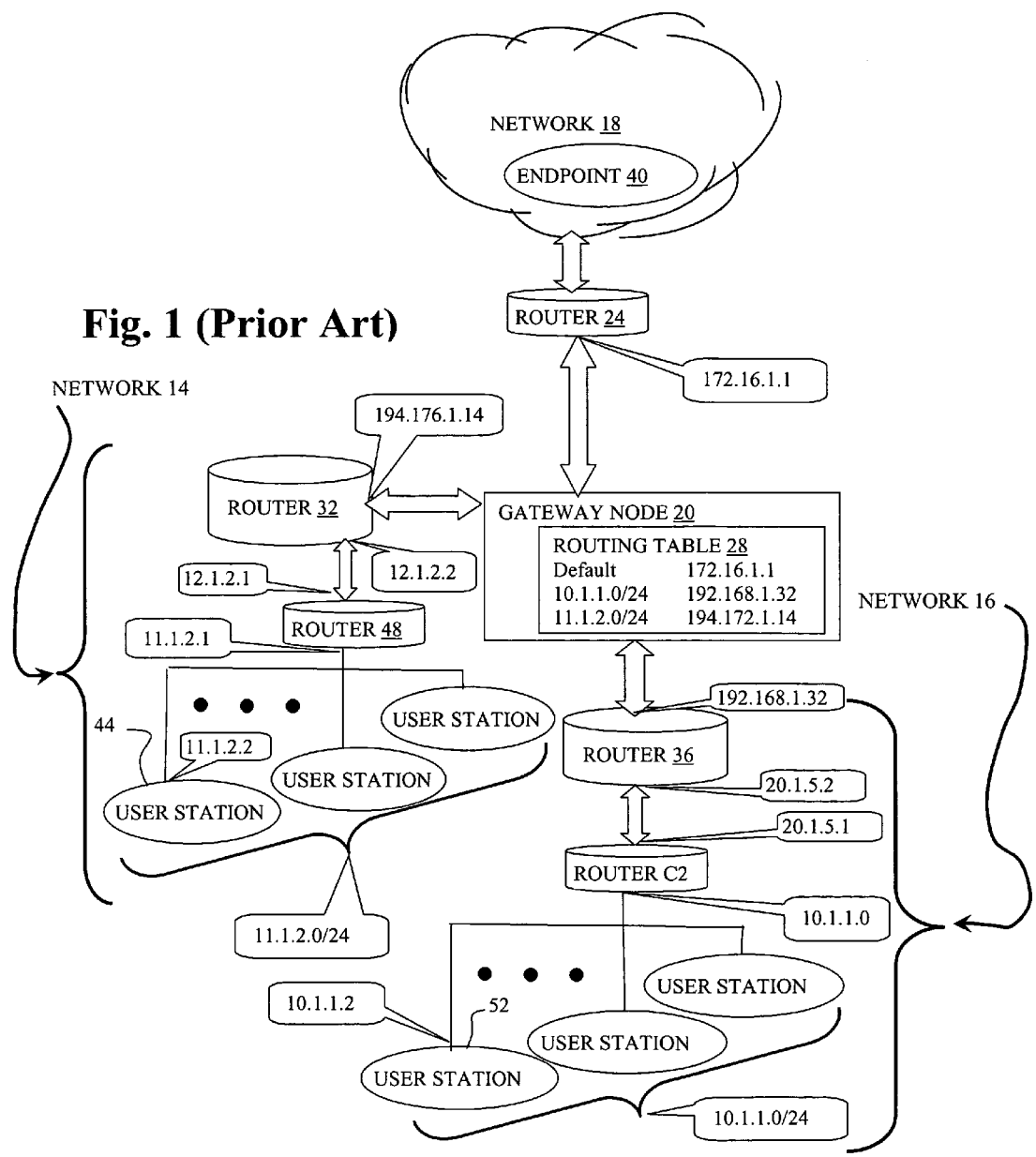
FIG. 1 is an illustrative example of a prior art gateway 20 in an operational context.
Figure 2:
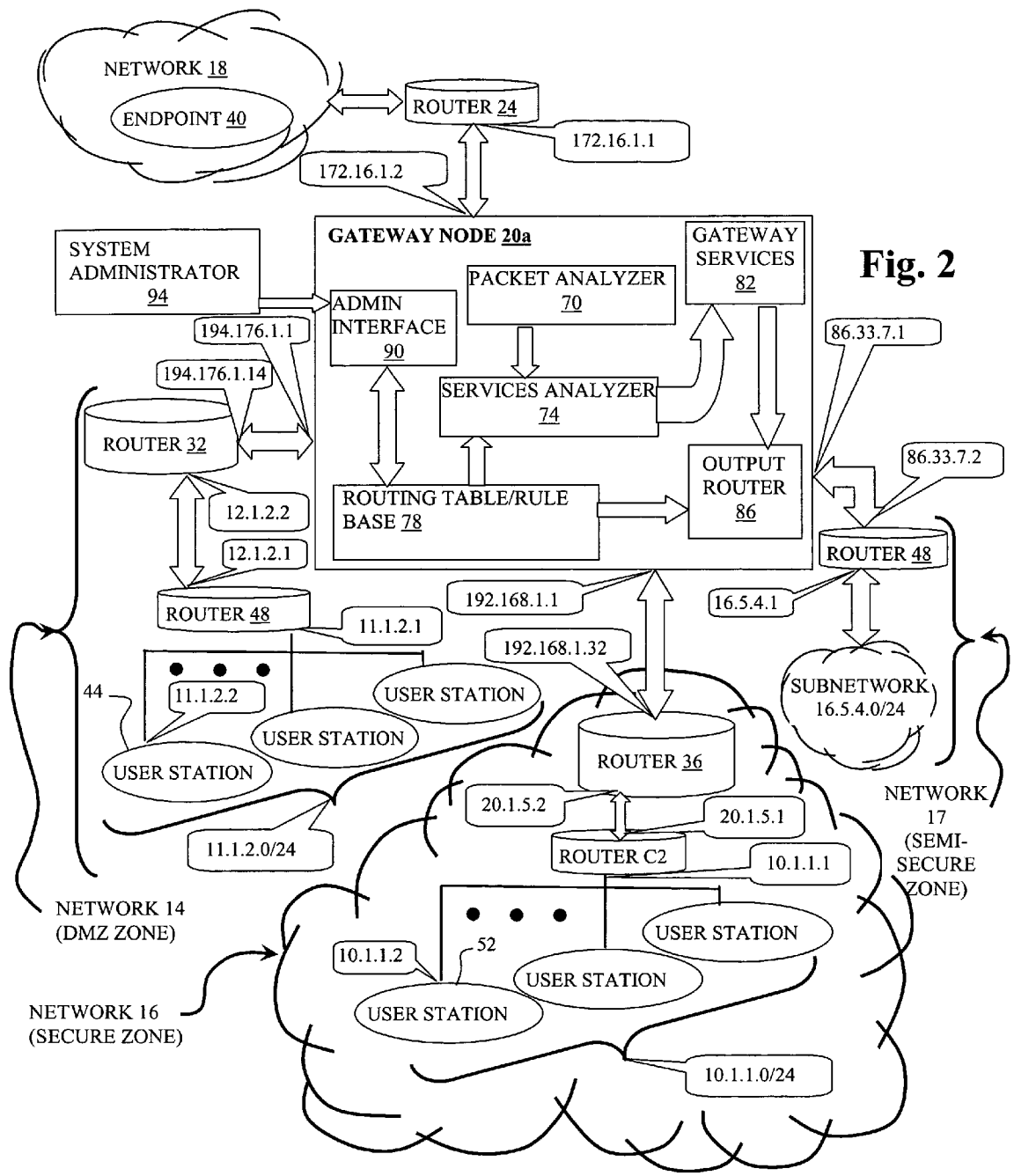
FIG. 2 is an illustrative example of an embodiment of a gateway 20a according to the present invention.

FIG. 2 shows an embodiment of an enhanced network gateway 20a according to the present invention, wherein this figure shows the gateway 20a in a substantially similar context to that of the gateway 20 of FIG. 1 (e.g., the networks 14 and 16 may be considered identical to those described with reference to FIG. 1). Thus, the gateway 20a can be considered as a device and system for routing communications between a plurality of networks operably connected to the gateway, wherein each of the networks: (i) includes a plurality of network nodes, each having a corresponding network address so that communications to nodes of the network are routed according to the network addresses, and (ii) the network addresses are administered (e.g., assigned, re-assigned, changed, deleted) independently of the other networks (e.g., a network configuration change to one of the networks does not affect the configuration of any of the other networks).

In particular, the gateway 20a can:

(2.1) Route communications between the networks internal to an organization or company (e.g., networks for which the services and communication analysis of the gateway 20a are intended to be of benefit); in FIG. 2 such internal networks are the networks 14, 16 and 17; however, note that it is an aspect of the invention that such routing by the gateway 20a can be substantially dependent upon the content and/or structure of the data packet(s) being routed as will be described further hereinbelow; and (2.2) Route communications between users of the internal networks, and one or more external networks (i.e., an external network is a network whose communications and configuration are not controllable by the organization or company responsible for the gateway 20a), e.g., network 18 represents one such external network.

Note that in FIG. 2, the networks 14 and 16 are now further specified, respectively, as a network from a DMZ zone, and a network from a secure zone according the description of these zones in the Terms and Descriptions section hereinabove. Moreover, the network 17 is identified as a semi-secure zone according to the description in the Terms and Descriptions section.

The gateway 20a includes a packet analyzer 70 for analyzing data packets received at the gateway. In particular, the packet analyzer 70 classifies such data packets according to one or more characteristics of the structure and/or content of the data packets. In particular, the packet analyzer 70 classifies such data packets according to their characteristics that identify, e.g., (i) the type of communication (e.g., its protocol, its encryption technique (if any)), (ii) the type of information provided in the packets (e.g., voice data, non-voice data, streaming data, multimedia data, etc.). The packet analyzer 70 determines at least some (if not most or all) of such characteristics substantially independently of both: any source or origination information included in the data packets, and destination information included in the data packets. Representative classifications for which the packets received at the gateway 20a may be classified are:

(3.1) Data packets transmitted to the gateway 20a from a particular zone classification, e.g., from a secure zone, an insecure zone, a DMZ zone, or a semi-secure zone; and (3.2) The type of data packets; e.g., data packets identified as one or more of:

(i) Internet packets identified as protocol data, e.g., the protocols: FTP, HTTP, telnet, SSH (i.e., Secure Shell, an application protocol commonly used to secure an interactive typing session between a user and a station under that user's control), DNS (i.e., Domain Name Service, an application protocol used by IP devices to map logical names to actual IP addresses), NetBios (i.e., an application protocol used primarily by Microsoft networking applications, e.g., domain login and Outlook). Note that such identification of Internet packets may be performed by examining the IP protocol being used (e.g., TCP, UDP) and the port being used. For example, SSH packets may be identified by the fact that they use the TCP protocol and are destined for TCP port 22, as one skilled in the art will understand;

(ii) A communication via a virtual private network, e.g., such identification may be performed by the steps at (4.2) below;

(iii) Internet packets identified as non-voice packets, e.g., identifications may be performed by the steps at (4.3) below;

(iv) Internet packets identified as having VoIP voice content (also referred to as, VoIP "bearer" traffic); e.g., such identification may be performed by the steps at (4.4) below;

(iv) Internet packets identified as controlling VoIP calls (also referred to as, VoIP "control" traffic); e.g., such identification may be performed by the steps at (4.4) below;

(v) data packets identified as having streaming and/or multimedia content therein; e.g., such identification may be performed by the steps at (4.5) below;

(vi) Quality of Service classification of data (see Terms and Description section); e.g., such identification may be performed by the steps at (4.6) below.

The packet analyzer 70 is configured to recognize particular features and/or structures when classifying data packets. For example, the packet analyzer 70 can perform the following tasks to recognize various data packet structures and/or packet content:

(4.1) For determining the identity of the router transmitting data packets to the gateway 20a, the packet analyzer 70 may inspect the transmission routing information associated with each such packet. Note that during configuration of the gateway 20a, for each router known to the gateway 20a as a source of data transmissions, the collection of the one or more networks from which the router receives such transmissions may be assigned a single zone classification such as one of the zones identified in the Terms and Descriptions section above. Thus, the identity (e.g., IP address, alternatively gateway 20a port number) of each such router can be used to determine the zone type for the communications from the router.

(4.2) For identifying data packets transmitted via a virtual private network, the packet analyzer 70 may perform at least one of the following steps:

(i) examine the source and destination IP addresses, and possibly the source and destination TCP and UDP ports of such data packets to determine if the IP addresses and ports match an administratively configured VPN policy, and (iii) identify the protocol of such data packets received at the gateway 20a when routing to any zone other than a secure zone, e.g., such a protocol may be "ESP" (i.e., IP protocol 50, Encryption Security Payload, as one skilled in the art will understand), or "AH" (IP protocol 51, Authentication Header);

(iv) identify the packet as received from the internal "Decryption" process; and (v) identify the packet as received from an internal decryption interface, as one skilled in the art will understand.

(4.3) For identifying Internet data packets containing non-voice data, the packet analyzer 70 may perform at least one of the following steps:

(i) examine IP headers of such data packets; in particular, examine the TOS field (described in the Terms and Definition section hereinabove), or the DiffSery bits (also described in the Terms and Definition section hereinabove) from such IP headers or examine the destination TCP or UDP ports, and (ii) examine packets for ports not belonging to those recognized as existing or to new H 323 sessions (identified via stateful inspection, as described in the Terms and Description section hereinabove).

(4.4) For identifying voice data packets, the packet analyzer 70 may perform at least one of the following steps:
(i) examine the TOS field or DiffSery bits from the IP header or examining the destination TCP or UDP ports, and
(ii) examine packets identified to be arriving for sessions established through H.323 (identified via stateful inspection).

(4.5) For identifying streaming and/or multimedia data packets, the packet analyzer 70 may: identify the communication protocol for the data packets as, e.g., one of RTP or RSVP, (these terms are described in the Terms and Descriptions section hereinabove).

(4.6) For determining a quality of service (QoS) classification for the data packets, the packet analyzer 70 may inspect the IP Packet Header (i.e., TOS field or DiffSery bits) for a bit pattern matching a "highest Class of Service" bit pattern.

(4.7) For identifying data packets that are to be processed by a particular application, the packet analyzer 70 may: determine the protocol and the port number of the gateway 20a for which such packets are to be routed (e.g., FTP packets may be transmitted to port 21, telnet may be transmitted to port 23, DNS may be transmitted to port 53, HTTP may be transmitted to port 80).

(4.8) For determining packets arriving from a particular interface or network port, the packet analyzer may perform a step of identifying the data by identifying the interface or network port on which the packet was received.

Note that each data packet may be classified into one or more classifications, or the data packet may be classified into a default classification in the event that the packet analyzer 70 identifies no other classification. For example, a data packet may be classified as received from the insecure zone, and being an FTP data packet.

The packet analyzer 70 provides the one or more classifications, for each data packet, to a services analyzer 74, wherein the services analyzer determines the (any) services to be applied to each data packet. The services analyzer 74 accesses the predetermined routing table/rule base 78 for obtaining data identifying the services to be performed for various data packet classifications as will be described in further detail hereinbelow. Note that the routing table/rule base 78 replaces the routing table 28 of FIG. 1 in that the routing table/rule base is a substantial enhancement of the routing table 28. In particular, the routing table/rule base identifies services to be applied to various data packets transmitted through the gateway 20a. An example of such a routing table/rule base 78 is shown in FIG. 3 which is described below.

However, for at least some embodiments of the invention, it is important to note that processing performed by the gateway 20a also provides the benefits of packet source transparency. That is, the gateway 20a may only utilize the IP addresses for routers: (a) that are directly connected to the gateway 20a, and (b) that are available for receiving transmissions from the gateway 20a. Thus, the operation of the gateway 20a can be substantially insensitive to IP address changes in the networks that communicate with the gateway. In particular, as long as the zone type designation does not change for the network(s) providing data transmissions to the gateway 20a, via one of the routers known to the gateway, then the gateway will not need to be reconfigured to reflect such network IP address changes such as adding or deleting IP networks, or assigning different IP addresses to existing user stations. That is, only IP address changes of the routers connected directly to the gateway 20a need be reflected in the routing table/rule base 78.

Once the services analyzer 74 determines which (if any) of the one or more gateway 20a services are to be applied to a data packet, the data packet and the identity of the service(s) (if any) to be applied are provided to the gateway services module 82 for applying the designated services to the data packet. Note that the services may include:

(5.1) Virtual private network processing such as:
(i) encryption of packet data,
(ii) decryption of packet data,
(iii) application of a signature to a packet (e.g., attaching electronic signature data to a packet for authenticating a source of the packet),
(iv) verification of a packet's signature,
(v) encapsulation of the packet (i.e., taking the original packet and adding an additional layer 3 header, e.g., IP header, and possibly other headers, e.g., GRE, to the packet, as one skilled in the art will understand), and
(vi) decapsulation of the packet (i.e., stripping the encapsulating layer 3 and any other headers, to get the original packet).

(5.2) Network address translation, e.g., for translating an initial destination network address of a data packet into another address that reflects the current network addressing of, e.g., one of the networks 14, 16, and 17.

(5.3) Voice over IP processing such as:
(i) prioritization of one or more packets within the outgoing transmission queues of gateway 20a to improve and/or maintain the voice quality of the transmission, and
(ii) establishing H 323 Call setup through an H.323 proxy (see Terms and Descriptions section for a description of these terms).

(5.4) Firewall processing such as examining a packet's content and/or the packet's IP addresses, and discarding the packet if any firewall rules are violated, e.g., rules related to Stateful inspection, and Denial of Service Attack Analysis (see Terms and Descriptions section for a description of these terms).

(5.5) Virus processing such as removing email attachments that meet the criteria of known viruses.

(5.6) Quality of service processing such as prioritization of one or more packets within the outgoing transmission queues of gateway 20a to meet configured Service Level Agreements.

(5.7) "Proxying" connections on behalf of requesting and/or protected network stations (wherein "proxying" a connection is the establishment, by a third party, of a communication connection between at least two networked stations, and in particular through a public network (e.g., the Internet) on behalf of the networked stations).

Upon application of (zero or more) gateway 20a services to a data packet, the data packet is provided to an output router module 86 for routing the data packet to its intended destination. Note that the output router module 86 may also access the routing table/rule base 78 for determining where to route the data packet. However, as will be described further hereinbelow, the output router 86 may utilize more information for routing the data packet than is available in, e.g., the routing table 28 of FIG. 1. In particular, routing may be dependent upon information describing the data packet's source (e.g., its zone, but not its originating IP address), the characteristics of the data packet determined by the packet analyzer 70, and/or the gateway services applied to the data packet.

The gateway 20*a* also includes an administrative interface 90 that, e.g., allows a system administrator 94 (either a person or a network configuration intelligent agent) to reconfigure the gateway 20*a* when necessary. In particular, the system administrator 94 may:

(6.1) Modify the routing table/rule base 78 to change, e.g., the services to be applied to particular data packets, to route certain data packets to different routers identified in the routing table/rule base 78, and/or to specify a different combination of gateway services to apply to data packets;

(6.2) Modify the services provided by the gateway 20*a*, e.g., add, or delete a gateway service, or, change the operation of an existing gateway service; and/or (6.3) Specify different zone identifiers for the network connections to the gateway 20*a*.

FIG. 3 shows a representative example of the routing table/rule base 78 according to the present invention, wherein the data therein is structured in table form (although other data structures are well within the scope of the invention, e.g., tree structures, intelligent agent data repositories, expert system rule bases, etc.). As shown, there is a column (in order from left to right) for each of the following:

(7.1) The zone designations of the source of data packet transmissions. Note that in addition to the zones described hereinabove in Terms and Descriptions section, other and/or alternative zone classifications are within the scope of the invention. For example, there may a zone for communications with one or more third parties wherein substantially all communication via the gateway 20*a* with such third parties is via a virtual private network (VPN). Additionally, if the zone of one or more networks can not be clearly established, then such networks (and the router which connects them to the gateway 20*a*) may be assigned a default zone (e.g., categorized as being in an insecure zone).

(7.2) Data packet characteristic(s) as determined by the packet analyzer 70. Note, that FIG. 3 shows only a few representative combinations of such characteristics that may be identified by the packet analyzer 70.

(7.3) Gateway 20*a* services sets, wherein this column identifies various combinations of services that are to be applied to particular data packets by, e.g., the gateway 20*a*. For example, in the first data row for data packets identified as coming from a secure zone and wherein the data packets may be of any type, no services will be performed by the gateway 20*a*. However, in the second row, IP data packets identified as non-voice, non-FTP packets from any zone, except for the secure zone, will have firewall processing applied thereto. Moreover, it is within the scope of the present invention for designating such services to be performed in a particular order; e.g., firewall services may be performed prior to any network address translation service. Accordingly, in FIG. 3, the notation "→" between identifications of gateway services to be performed designates that the services are to be performed in left to right order. However, other operators are also within the scope of the invention. For example, in the event that such services can be asynchronous (e.g., can be performed in parallel, or the order is not substantially important, such as network address translation, and firewall services), the order of service performance may be determined at the time the data packets are to be processed. In FIG. 3, the "+" designates such an asynchronous operator between designated services.

(7.4) Target IP addresses, wherein entries of this column identify IP addresses of routers directly connected to the gateway 20*a*, wherein data packets can be forwarded by the gateway to these routers after the (any) corresponding gateway services are applied.

Each data row of the routing table/rule base 78 may be considered as an "if-then" rule, wherein when the conditions corresponding to the first two columns of the row are satisfied, then the actions corresponding to the second two columns of the row are performed. For example, the third data row is equivalent to the following pseudo-code:

IF (the data packet is not from the secure zone) AND (the data packet is an IP non-voice VPN packet) THEN
Perform VPN processing;
Then perform network address translation; and
Then transmit the resulting data packet to the router identified by the IP address 192.168.1.32 (e.g., router 36, FIG. 2).

Note that in the embodiment shown in FIG. 3, the first data row of the routing table/rule base 78 specifies that any data packet from a secure zone is routed, without any services applied, to the router 24 that transfers data packets to the Internet (or another network of an insecure zone). The motivation for such a routing rule is that the only transmissions from the secure zone (e.g., network 16) to the gateway 20*a* are assumed to be those that are bound for the insecure zone. Accordingly, if a user at a user station within the secure zone transmits a message to a user at a user station in, e.g., the DMZ zone, then, e.g., each of the routers 32, 36 and 48 may be able to route to one another through a route that bypasses the gateway 20*a*, or there may be one or more additional routers (not shown) for routing between such zones and bypassing the gateway 20*a*. That is, in the present embodiment of FIG. 3, it is assumed that the gateway 20*a* is primarily intended for routing communications between the insecure zone (e.g., the Internet), and one of the other zones.

Additionally, note that the last two rows of the routing table/rule base 78 are default rules, wherein one of these rules applies if no other rule applies. Thus, in the next to last row, the corresponding rule is equivalent to the following pseudo-code:

IF (the data packet is from any zone except an insecure zone) AND (the data packet is not processed according to a row above the present row) THEN
Perform firewall processing;
Then transmit the resulting data packet to the router identified by the IP address 86.33.7.2 (e.g., router 48).

FIG. 4 is a flowchart of the steps performed by the embodiment of the present invention illustrated in FIGS. 2 and 3. In step 404, the security gateway 20*a* receives one or more data packets from one of the routers directly connected to the gateway 20*a* via an interface of the gateway (e.g., a private interface, a.k.a., an interface attached to a "Secure" zone such as network 16 of FIG. 2). In step 408, the packet analyzer 70 determines one or more characteristics of the data packet as described hereinabove. In one embodiment, the packet analyzer 70 may terminate packet analysis if it is determined that the data packet is received from a secure zone as per the rule corresponding to the first data row of the routing table/rule base 78. However, such an embodiment may require configuration of the packet analyzer 70 so that its analysis is data-driven by the information residing in the routing table/rule base 78. In such an embodiment, the packet analyzer 70 may have a configuration component (not shown) that prioritizes or ranks the various types of analysis to be performed according to, e.g., the most likely data packet characteristics to occur, and/or data packet characteristics that can make further packet analysis unnecessary.

Subsequently, since the first row of the routing table/rule base 78 corresponds to a rule whose only condition is that the packet is from the secure zone, this rule is represented in step 412. Note that the packet analyzer 70 or the services analyzer 74 may perform step 412 for determining whether the data packet is from the secure zone. In the embodiment where the packet analyzer 70 performs step 412, and if the determination is positive, the packet analyzer 70 ceases any further packet analysis as described in the enhanced embodiment of the packet analyzer 70 above. In another embodiment, the services analyzer 74 performs step 412 after all packet analysis has been performed. In either case, the services analyzer 74 uses the packet identification results received from the packet analyzer 70 for determining which rule of the rules corresponding to the rows of the routing table/rule base 78 is to be performed. In particular, the rule for each row, sequentially from the top to the bottom of the data rows of FIG. 3, is inspected to determine whether the conditions of the "SOURCE ZONE" and the "DATA PACKET CHARACTERISTIC(S)" columns are satisfied by the results from the packet analyzer 70.

If the result from step 412 is negative, then step 416 is performed. If the packet analyzer 70 is still processing the data packet at this step, then the packet analyzer continues to identify characteristics of the data packet as in substep (A) of step 416. Regardless of whether the packet analyzer 70 performs an analysis of the data packet characteristics or terminates early, the services analyzer 74 evaluates the rules of the routing table/rule base 78 for determining a rule whose conditions according to the first two columns of FIG. 3 can be satisfied. Note that if substep (A) of step 416 is performed, then the services analyzer 74 commences rule evaluation with the rule corresponding to the first data row of FIG. 3. Alternatively, if substep (A) is not performed, then the services analyzer 74 may commence rule evaluation with the rule corresponding to the second data row of FIG. 3.

Subsequently, once a rule is found whose conditions are satisfied, the services analyzer 74 identifies the services to be performed according to the "Services Set" column of FIG. 3, and outputs to the gateway services module 82 the data packet together with an identification of the (any) service(s) to be applied to the data packet (and any designated order to apply such services). In step 420, the services module 82 applies the identified services (in the order, if any, specified) to the data packet. Additionally, upon application of a service, the services module 82 may associate a label or tag with the data packet indicating that the service was performed on the data packet. Such labels or tags can be useful when there is a plurality of available services that may be performed. In particular, a primary function of the gateway services module 82 can be to efficiently schedule activation of the various services for various data packets. Since such scheduling is likely to depend on the rate at which data packets are received and the activation frequency of the services, the services module 82 may (if there are no constraints otherwise) dynamically and in real-time determine which services are going to be applied to which data packets. Thus, of two data packets requiring services corresponding to the expression "FW+NAT", the first of these data packets may be processed by a firewall service first and subsequently processed by a network address translation service, and the second of these data packets may be processed by the network translation service first and subsequently processed by a firewall service.

Note that such labeling can provide a way to ensure that each service to be applied to the data packet is indeed applied. Additionally, in another embodiment where the gateway 20a identifies the service(s) to be performed, but the gateway services module 82 does not have the resources to perform one or more of the services (e.g., due to time constraints on the delivery of the packets, e.g., due to a large volume of data packets to be processed, or one of the services is experiencing a failure or malfunction due to, e.g., a software bug or a platform running the service malfunctioning), such labels may be provided with their corresponding data packets when the data packets are routed by the gateway 20a. In this embodiment, if network nodes along the route of the incompletely processed data packet also have the ability to apply the additionally needed services, then the data packet labels can be checked by other downstream network components and apply appropriate services as necessary. Note that such downstream network components may be additional embodiments of the gateway 20a wherein such embodiments may analyze the contents of the data packets, determine from their (any) labeling whether there are services that still must be applied to the data packets and apply such services.

Subsequently, once the gateway services module 82 has applied the available services to the data packet, in step 424, the output router 86 routes the data packet to the destination router identified by the rule applied from the routing table/rule base 78. Note that in one embodiment, the output router 86 may receive the identification of the destination router from services analyzer 74 since it has already identified the row/rule of the routing table/rule base 78 for the data packet. However, in an alternative embodiment, the output router 86 may also query the routing table/rule base 78 for determining the row/rule and thereby obtain the identity of the destination router. In particular, such a query may use the classification of data packet (from at least one of steps 408 and 416) together with any labeling data indicative of services, e.g., applied to the data packet.

Following step 424, step 428 is performed wherein the gateway 20a waits (if necessary) for another data packet to be received. However, it is important to note that data packets are likely to be pipe-lined through the gateway packet processing components (i.e., the packet analyzer 70, the services analyzer 74, the gateway services module 82, and the output router 86). In particular, each of these gateway 20a components may be concurrently processing different data packets. Moreover, since data packets for a single communication (i.e., from a single source wherein all packets have the same packet characteristics) may arrive at the gateway without other intervening packets being received, such same communication packets may be processed as a group by each of the gateway packet processing components.

Returning now to step 412, if it is determined that the data packet was received from the secure zone, then upon receiving information (or determining) that the data packet is from the secure zone, the services analyzer 74 determines that no services are to be applied to the data packet (as per the first data row of the routing table/rule base 78). Subsequently, the data packet and an indication that no services are to be performed are input to the gateway services module 82 which accordingly applies no services, and passes the data packet to the output router 86, which (in step 432) transmits the data packet to the insecure zone (i.e., router 24). Following the transmittal (and/or concurrently therewith), the gateway 20a processes (or waits for) the next data packet(s) (step 428).

It is worthwhile to note that the services analyzer 74 may be embodied as an expert system or other data-driven "intelligent" component that can decide what services need to be applied to various data packets based on the source of the data packets, the structure of data packets, the contents of the data packets. Moreover, an embodiment of the service analyzer 74 may use additional information in processing data packets. For instance, if a data packet's corresponding expression in the "Services Set" column of the routing table/rule base 78 identifies one or more of the services that the gateway services module 82 does not have the resources to appropriately perform, then the services analyzer 74 may be requested by the output router 86 to determine a router based additionally upon what services where actually applied to the data packet and/or what services still need to be applied.

FIG. 5 shows another embodiment of the routing table/rule base 78, wherein routing and/or gateway services may be dependent on distinguishing between, e.g., the DMZ zone, and the semi-secure zone. Note that the next to the last data row in FIG. 5 is split for the last two columns thereby indicating that data packets identified by this row are duplicated so that for a first version or copy of the data packets (e.g., having substantially all of the content of the corresponding packets received at the gateway), no services are performed and these data packets are routed to the router 24, and for a second version or copy of the data packets, firewall services are performed and these data packets are routed to the internal router 48. Such gateway processing is desirable for logging and monitoring internal network transmissions. For example, such gateway processing can be used for providing the gateway services of (1.4) and (1.5). Assuming all rules corresponding to rows above the next to last row are not applicable, the pseudo-code for the rule corresponding to the this row is as follows:

IF (the data packet is from any zone except an insecure zone) THEN Duplicate the data packet;
Sent the original data packet to the router 24;
Perform firewall processing on the duplicate data packet;
Then transmit the firewall processed duplicate data packet to the router 48.

The present invention may be embodied as a combination of both hardware devices and software (including firmware). Accordingly, suitable software for operatively enabling various aspects of the present invention, discussed herein and shown in the accompanying figures, can be provided on a computer-readable medium or media, and can be coded using any suitable programming or scripting language. However, it is to be understood that the invention as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like, as well as various network communication languages such as Perl and Java.

As those skilled in the art will also understand, the program (s) of instructions for embodying the various aspects of the invention can be loaded and stored onto a program storage medium or device readable by a computer or other machine, executed by the machine to perform the various aspects of the invention as discussed and claimed herein, and/or as illustrated in the accompanying figures. The program storage medium can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In particular, an embodiment of the invention may reside on a medium directly addressable by a computer's processor (main memory, however implemented), and/or on a medium indirectly accessible to the processor (secondary storage media such as hard disk drives, tape drives, CD-ROM drives, floppy drives, or the like).

Moreover, although various components of the present invention have been described in terms of communications on an IP network, it is within the scope of the present invention to encompass other types of networks, for example, Novell (i.e., networks using the IPX network protocol), or AppleTalk networks. Furthermore, a program and data storage device (e.g., the services analyzer 74 and the routing table/rule base 78) can be affixed permanently or removably to a bay, socket, connector, or other hardware provided by a cabinet, motherboard, or another component of a given computer system or a given networked distributed computing system.

Those skilled in the art will also understand that networked computational components in accordance with the above teaching using known programming languages provides suitable means for realizing the various functions, methods, and processes as described and claimed herein and as illustrated in the accompanying figures attached hereto.

Those skilled in the art will further understand, when reading this description, that unless expressly stated to the contrary, the use of a singular or a plural number herein is generally illustrative, rather than limiting, of the instant invention. Accordingly, unless expressly stated otherwise or clear from the context, where a given item or aspect of the invention is discussed herein in the singular, it is to be understood that the invention also contemplates a plural number of such items.

The foregoing discussion of the invention has been presented for purposes of illustration and description. The description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

The invention claimed is:
1. A network gateway, comprising:
an interface of a gateway, the interface being configured to receive packetized communications from at least one networked source component;
a data analyzer configured to analyze a selected packetized communication received by the interface, from the analysis of the selected packetized communication, the data analyzer configured to identify one or more characteristics of at least one of a structure and a content of the selected communication received at the gateway, wherein the one or more characteristics include at least two of: a) an identification of a source of the selected packetized communication; b) the structure of the data in the selected packetized communication, (c) the contents of the data in the selected packetized communication, (d) the services identified for application to the data of the selected packetized communication, and (e) the services applied to the data of the selected packetized communication;

and wherein each of said one or more characteristics is identified substantially independently of both: information in the selected packetized communication indicating an address of an origination of the selected packetized communication and information in the selected packetized communication indicating a destination of the selected packetized communication;

a routing component configured to output, from the gateway, data corresponding to the selected packetized communication to a selected at least one of a plurality of networked destination components;

wherein the at least one of a plurality of networked destination components is selected via a particular association between the identified one or more characteristics and the at least one of a plurality of networked destination components, said particular association being available to the gateway prior to the gateway receiving the selected packetized communication;

services analyzer configured to analyze each of said identified one or more characteristics and a particular at least one network zone classification associated with a networked source component originating the selected packetized communication to determine one or more services for application data included in the selected packetized communication, wherein the one or more services include at least one of:

(a) a firewall service;
(b) a network address translation service;
(c) a telephony service;
(d) a network monitoring service for identifying illicit or improper communications;
(e) a network monitoring service for determining conformance with a licensing agreement; and
(f) a file transfer service.

2. The network gateway of claim 1, wherein the data analyzer identifies the one or more characteristics of the selected packetized communication as one or more of:

(a) voice over Internet Protocol (IP) data;
(b) streaming data;
(c) multimedia data;
(d) File Transfer Protocol (FTP) data;
(e) Hypertext Transfer Protocol (HTTP) data;
(f) telnet data;
(g) non-voice data; and
(h) virtual private network data.

3. The network gateway of claim 1, wherein there is a communication received at the gateway for each of the following data types: (a) voice over Internet Protocol (IP) data, (b) streaming data, (c) multimedia data, (d) File Transfer Protocol (FTP) data, (e) non-voice data, and (f) virtual private network data, and the data analyzer identifies each of the data types.

4. The network gateway of claim 1, wherein the data analyzer determines a zone classification for a network from which the selected packetized communication is received, wherein the classification is indicative of one or more security characteristics of the network.

5. The network gateway of claim 1, wherein said particular association is one of a plurality of associations available to the gateway, wherein each of the associations associates: (i) a set of one or more characteristics for identifying packetized communications received at the gateway with (ii) an identification of a corresponding set of one or more services for application to the identified packetized communications.

6. The network gateway of claim 5, wherein, for the characteristics, the corresponding set of services includes one or more of:

(a) a firewall service;
(b) a network address translation service;
(c) a telephony service
(d) network monitoring service for identifying illicit or improper communications;
(e) network monitoring service for determining conformance with a licensing agreement; and
(f) a file transfer service.

7. The network gateway of claim 6, further including a services analyzer that uses the characteristics for identifying at least some of (a) through (f) for application to the selected packetized communication.

8. The network gateway of claim 5, wherein each association (A) of the plurality of associations has associated therewith the address of one of the networked components, wherein, for a packetized communication received by the gateway having the set of characteristics for the association (A), there is a corresponding gateway output to the networked component whose address is associated with the association (A).

9. A method of routing communications between a plurality of networks via a communications gateway, comprising:

receiving, at the gateway, a communication from a first network;

analyzing a content within the communication and a structure of the communication;

in response to the analyzing, identifying, by the gateway, one or more characteristics of the structure and the content of the communication, wherein the characteristics that are identified include at least two of: a) an identification of a source of the communication; b) the structure of the data in the communication, (c) the contents of the data in the communication, (d) the services identified for application to the data of the communication, and (e) the services applied to the data of the communication, and wherein each of said characteristics is identified substantially independently of both:

information in the communication indicating an originating source of the communication and information in the communication indicating a destination of the communication;

obtaining, by the gateway, an address for at least one networked component of a second network from a particular association between the characteristics and the address;

wherein said particular association is available to the gateway prior to the gateway receiving the communication; and analyzing the characteristics and a particular at least one network zone classification associated with a networked source component originating the selected communication to determine one or more services for application data included in the selected communication, wherein the services include at least one of:

(a) a firewall service;
(b) a network address translation service;
(c) a telephony service;
(d) a network monitoring service for identifying illicit or improper communications;
(e) a network monitoring service for determining conformance with a licensing agreement; and
(f) a file transfer service; and transmitting, by the gateway, data corresponding to the communication to the at least one networked component.

10. The method of claim 9, wherein the address for the at least one networked component is used in performing said transmitting step and wherein said obtaining step includes determining the address substantially independently of at least information in the communication indicating a destination of the communication.

11. The method of claim 9, wherein said obtaining step includes identifying a service for application to the communication, wherein the service is one of:
   (a) a firewall service;
   (b) a network address translation service;
   (c) a telephony service
   (d) network monitoring service for identifying illicit or improper communications;
   (e) network monitoring service for determining conformance with a licensing agreement; and
   (f) a file transfer service; and
   further including a steps of applying the service to the communication prior to said step transmitting step and of applying at least two of the services (a) through (f) in a predetermined order.

12. The method of claim 9, wherein said obtaining step includes comparing a network security classification for the first network with a corresponding security classification for the particular association.

13. The method of claim 9, wherein the first network includes a portion of the Internet, and the second network is identified as being more secure.

14. The method of claim 9, wherein the one or more characteristics identifies the communication as including at least one of:
   (a) voice over Internet Protocol (IP) data;
   (b) streaming data;
   (c) multimedia data;
   (d) File Transfer Protocol (FTP) data;
   (e) Hypertext Transfer Protocol (HTTP) data;
   (f) telnet data;
   (g) non-voice data; and
   (h) virtual private network data.

15. The method of claim 9, wherein the address identifies a router that routes communications to the second network.

16. The method of claim 9, wherein the first network and the second network each have nodes whose addresses are administered independently from an administration of the other of the first and second networks.

17. The method of claim 9, further including a step of comparing the characteristics with corresponding information in a plurality of predetermined associations, each predetermined association for associating a collection of one or more identifiers of characteristics of communications received at the gateway with service information identifying one or more corresponding services for applying to the communications;
   wherein the one or more services provide one of: (i) encryption or decryption of communications received at the gateway; (ii) network address translation for changing destination addresses of communications received at the gateway; (iii) prioritizing at least some communications received at the gateway so that the at least some communications are output by the gateway according to a corresponding priority; and (iv) virus scanning;
   wherein the particular association is included in the plurality of predetermined associations.

18. The method of claim 9 further including applying one or more services to the communication, wherein the one or more services are determined from service identification information included in the particular association.

19. A network gateway, comprising:
   interface means for receiving packetized communications from at least one networked source component, the at least one networked source component being associated with at least one network zone classification;
   data analysis means for analyzing a structure and a content of a selected packetized communication received by the interface means, from the analysis of the selected packetized communication, the data analysis means identifying one or more characteristics of at least one of a structure and a content of the selected packetized communication received at the gateway, wherein the characteristics that are identified include at least two of: a) an identification of a source of the selected packetized communication; b) the structure of the data in the selected packetized communication, (c) the contents of the data in the selected packetized communication, (d) the services identified for application to the data of the selected packetized communication, and (e) the services applied to the data of the selected packetized communication;
   services analysis means for using the one or more characteristics and a particular at least one network zone classification associated with a networked source component originating the selected packetized communication to determine one or more services for application to data included in the selected packetized communication, wherein the services include at least one of:
      (a) a firewall service;
      (b) a network address translation service;
      (c) a telephony service
      (d) network monitoring service for identifying illicit or improper communications;
      (e) network monitoring service for determining conformance with a licensing agreement; and
      (f) a file transfer service;
   routing means for outputting, from the gateway the data included in the selected packetized communication, said data output to at least one of a plurality of networked destination components, the at least one of a plurality of networked destination components being operably connected to the gateway for receiving packetized communications from the gateway, each of the plurality of networked destination components having a corresponding different and unique identifying address;
   wherein for selecting the at least one of a plurality of networked destination components to which the selected packetized communication is to be directed, the routing means uses a particular association among:
      (1) the characteristics of the selected packetized communication,
      (2) the particular network zone classification associated with the selected packetized communication;
      (3) the one or more services to be applied to the selected packetized communication; and
      (4) the identifying address for the at least one of a plurality of networked destination components,
   wherein said particular association is available to the gateway prior to the gateway receiving the packetized communication.

20. The network gateway of claim 19, wherein the address of the origination of the selected packetized communication, and the identifying address for the at least one networked component are each IP addresses, wherein at least one of the services is performed prior to the routing means outputting the data from the gateway, wherein the network zone classification is a classification of the selected packetized communication based on a security of a network from which the gateway receives the selected packetized communication and wherein each of said characteristics is identified substantially independently of both: information in the selected packetized communication indicating an address of an origination of the selected packetized communication and information in the selected packetized communication indicating a destination of the selected packetized communication.

21. The network gateway of claim 1, further comprising:
a services analyzer configured to use the characteristics to select a set of services to be applied to the selected packetized communication;
and wherein
the address of origination of the selected packetized communication is associated with a network zone classification:
the particular association is among:
  (1) the characteristics of the selected packetized communication,
  (2) the network zone classification associated with the address of origination;
  (3) the set of services to be applied to the selected packetized communication; and
  (4) an identifying address of the selected at least one of a plurality of networked destination components.

22. The network gateway of claim 21, wherein:
the set of services includes one or more of:
  (a) a firewall service;
  (b) a network address translation service;
  (c) a telephony service
  (d) network monitoring service for identifying illicit or improper communications;
  (e) network monitoring service for determining conformance with a licensing agreement; and
  (f) a file transfer service; and
the set of services is selected using the network zone classification associated with the address of origination.

23. The method of claim 9, further comprising:
selecting, based at least in part on the characteristics, a set of services to be applied to the received communication;
and wherein:
an address of the originating source of the received communication is associated with a network zone classification;
the particular association, used in obtaining the address for the at least one networked component, is among:
  (1) the characteristics of the received communication,
  (2) the network zone classification;
  (3) the set of services to be applied to the received communication; and
  (4) the address of the originating source of the received communication.

24. The network gateway of claim 23, wherein:
the set of services includes one or more of:
  (a) a firewall service;
  (b) a network address translation service;
  (c) a telephony service
  (d) network monitoring service for identifying illicit or improper communications;
  (e) network monitoring service for determining conformance with a licensing agreement; and
  (f) a file transfer service; and
the set of services is selected using the network zone classification.

* * * * *